United States Patent [19]

McCarthy

[11] Patent Number: 4,940,376

[45] Date of Patent: Jul. 10, 1990

[54] SCRAP LOADER FOR MOLTEN METAL FURNACE

[75] Inventor: John McCarthy, Benton Harbor, Mich.

[73] Assignee: MPH Industries, Inc., Riverside, Mich.

[21] Appl. No.: 256,730

[22] Filed: Oct. 12, 1988

[51] Int. Cl.[5] .......... F27D 3/04; B65G 65/02

[52] U.S. Cl. .......... 414/198; 110/109; 198/550.01; 198/739; 432/64

[58] Field of Search .......... 414/158, 160, 172, 176, 414/180, 187, 198; 198/540, 739, 550.01; 432/64, 242; 110/101 R, 101 A, 105, 108, 109, 114, 160, 179, 289

[56] References Cited

U.S. PATENT DOCUMENTS

| | | | |
|---|---|---|---|
| 2,037,990 | 4/1936 | Martin | 110/109 X |
| 2,169,390 | 8/1939 | McCurdy | 110/109 X |
| 2,348,494 | 5/1944 | Peters | 414/198 X |
| 2,404,211 | 7/1946 | Biddle, Jr. et al. | 414/198 |
| 2,423,110 | 7/1947 | Mosshart | 414/176 X |
| 2,487,464 | 11/1949 | Mosshart | 414/176 X |
| 2,556,467 | 6/1951 | Cannon, Jr. | 110/114 X |
| 2,749,666 | 6/1956 | Baque | 414/198 X |
| 3,575,398 | 4/1971 | Lincoln et al. | 432/64 X |
| 3,674,903 | 7/1972 | Bintzer | 432/64 X |
| 3,885,950 | 12/1974 | Hughes, Jr. et al. | 414/187 X |

FOREIGN PATENT DOCUMENTS

| | | | |
|---|---|---|---|
| 2101170 | 7/1971 | Fed. Rep. of Germany | 110/109 |

*Primary Examiner*—David A. Bucci

*Attorney, Agent, or Firm*—Flynn, Thiel, Boutell & Tanis

[57] ABSTRACT

A scrap loader for a molten metal furnace. A loader housing, to be positioned beside a molten metal furance, includes a chamber having an inlet portion for receiving metal scrap and an outlet port through which the metal scrap is to be fed into the furnace. Metal is fed to the chamber along a path. A ram assembly in the housing comprises a leg unit pivoted with respect to the housing, a ram fixed on the leg unit and pivotable therewith along a wall of the chamber past the inlet port and toward the outlet port, and a device actuable for pivotally advancing and retracting the ram along the chamber wall and therewith for driving metal scrap along the wall and through the outlet port into the furnace.

9 Claims, 4 Drawing Sheets

SCRAP LOADER FOR MOLTEN METAL FURNACE

FIELD OF THE INVENTION

This invention relates to a scrap loader for a molten metal furnace.

BACKGROUND OF THE INVENTION

A known molten metal furnace comprises a large generally rectangular metal box internally lined with high temperature insulating board which shields the steel furnace walls from degradation by molten metal in the furnace. Sloped, forwardly and upwardly facing, doors are closed to cover an opening in the front portion of the furnace top wall and extending into the top portion of the furnace front wall. The sloped doors are typically hinged along their rear edges to the central portion of the furnace top. The doors are normally closed during ongoing heating of metal in the furnace to render such metal molten. During operation, the furnace contains a pool of molten metal heated by conventional means, the top of the metal bath being below the bottom edge of the door opening. Furnaces of the above-described type are for example used for melting scrap pieces of metal, such as scrap aluminum or zinc pieces.

Molten metal is removed periodically from the furnace by conventional means which do not require discussion here. It is thus necessary to periodically add metal to be melted to the furnace. It has been common in the past to load a furnace of this type by opening the doors and dumping a quantity of pieces of scrap directly at the furnace through the door opening, from a container carried by a forklift truck.

However, occasionally, when care is not taken, this loading method may cause problems. For example pockets of cutting oil or water may be present in the scrap. Further, it has been known to add several containers of scrap to a furnace, one immediately after the other, and to tamp down the scrap with the forks of the forklift truck. A pocket of liquid which happens to be left in the scrap from the first container may thus be forced down into the existing molten metal bath in the furnace and be almost instantaneously vaporized and/or ignited and expand explosively. Thus, a series of errors in batch loading of scrap into the furnace through the open doors could possibly result in an explosion.

Prior to the present invention, the present inventor designed and built a loading unit to avoid such batch loading of scrap into a furnace through the doors. Such loading unit aligned a linear vibrating conveyor with a hole in the side of the furnace, above the molten metal level therein. An air curtain directed into the output end of the conveyor helps protect it from damage by hot gases escaping from the furnace through the hole in the side of the furnace. The vibrating conveyor used was a Model Furnace Feeder made by Prab, located in Kalamazoo, Mich. However, the scrap metal placed on the conveyor frequently is of irregular shape, for example flashing from trim presses or sprues and runners from die casting machines. Irregular scrap of this kind tends to become tangled up in a mass on the conveyor, occasionally jamming the conveyor and thereby stopping the feed of scrap material into the furnace. Such stoppages interfered with continuous feeding of scrap to the furnace and required manual attention to restore normal feeding.

Accordingly, the objects and purposes of the present invention are met by providing a scrap loader for a molten metal furnace, which is intended to avoid the above-discussed problems of scrap loading, which provides for positive feeding at a controlled continuous rate of metal scrap of even irregular readily tangled shapes, which is compact and readily mountable beside existing furnaces, and which can be constructed from readily available parts and materials at relatively modest cost.

Other objects and purposes of this invention will be apparent to persons acquainted with apparatus of this general type upon reading the following description and viewing the accompanying drawings.

The objects and purpose of this invention are met by providing a scrap loader for a molten metal furnace, comprising a chamber having an inlet port for receiving scrap metal and an outlet port through which metal scrap is to be fed into the furnace. A ram assembly comprises a ram pivotal along a wall of the chamber past the inlet port and toward the outlet port and means actuable for pivotally actuating the ram to drive the metal scrap along the wall and through the outlet port into the furnace.

In the following description, the terms "front" and "rear", and words of similar meaning, shall refer to directions to the right and left respectively in FIG. 2.

DETAILED DESCRIPTION

Figure 1:
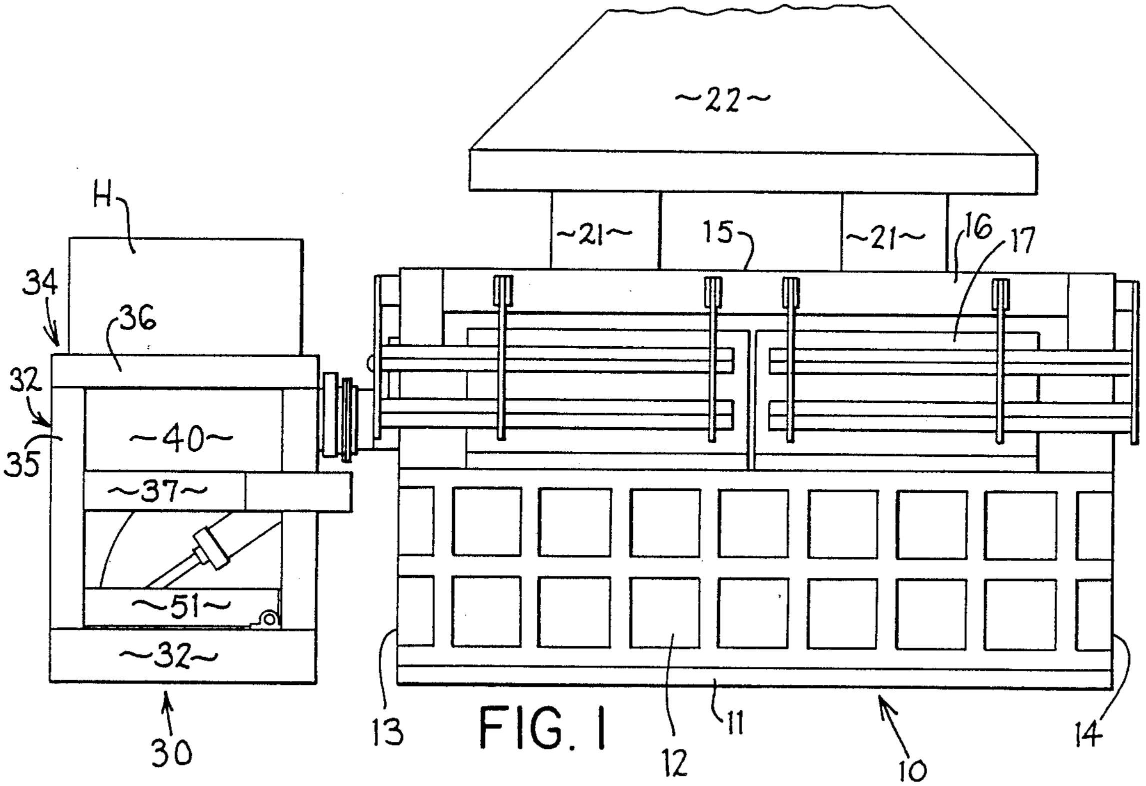
FIG. 1 is a front elevational view of a conventional scrap metal furnace equipped with a scrap loader embodying the invention.

A conventional molten metal furnace 10 (FIG. 1) comprises a generally rectangular box of steel having a bottom 11, a front wall 12, side walls 13 and 14, a back wall (not shown) and a top wall 15. The top part of the front wall 12 and the front part of the top wall 15 are cut away and the top front corners of the side walls 13 and 14 are cut away at an angle, to form an opening rimmed by a suitable door frame 16 carrying top hinged doors 17 openable for access to the interior of the furnace. The inside surfaces of the furnace walls are lined by a high temperature insulating board lining 20 (FIG. 2). Flues 21 open through the top wall 15 of the furnace and convey hot exhaust gases from the furnace to an overlying hood 22 for subsequent exhausting. The flues are preferably lined as indicated at 23 (FIG. 2).

To the extent above described, the disclosed apparatus is conventional and requires no further discussion as to structure or operation.

Turning now to the aspects of the disclosed embodiment more particularly dealing with the present invention, a scrap loader 30 (FIGS. 1 and 2) comprises a housing 31 including a base 32 supported (here by feet 33) on a floor F adjacent the side wall 13 of the furnace 10. The housing has a rectilinear frame 34 (FIGS. 1 and 2) upstanding from the base. In one embodiment constructed according to the invention, the frame comprises four corner legs 35 upstanding from respective corners of the substantially rectangular base 32 and fixedly supporting the corners of a horizontally extending, correspondingly rectangular, open center top rim 36. In the embodiment shown, the frame 34 further includes, at an intermediate height spaced between the top rim 36 and base 32, a generally rectangular belt 37 of horizontally extending rigid reinforcing members. Disposed within the upstanding frame 34 are near and far side walls 40 and 41. In the embodiment shown, the side walls 40 and 41 extend from the top rim 36 down to the belt 37.

Figure 3:
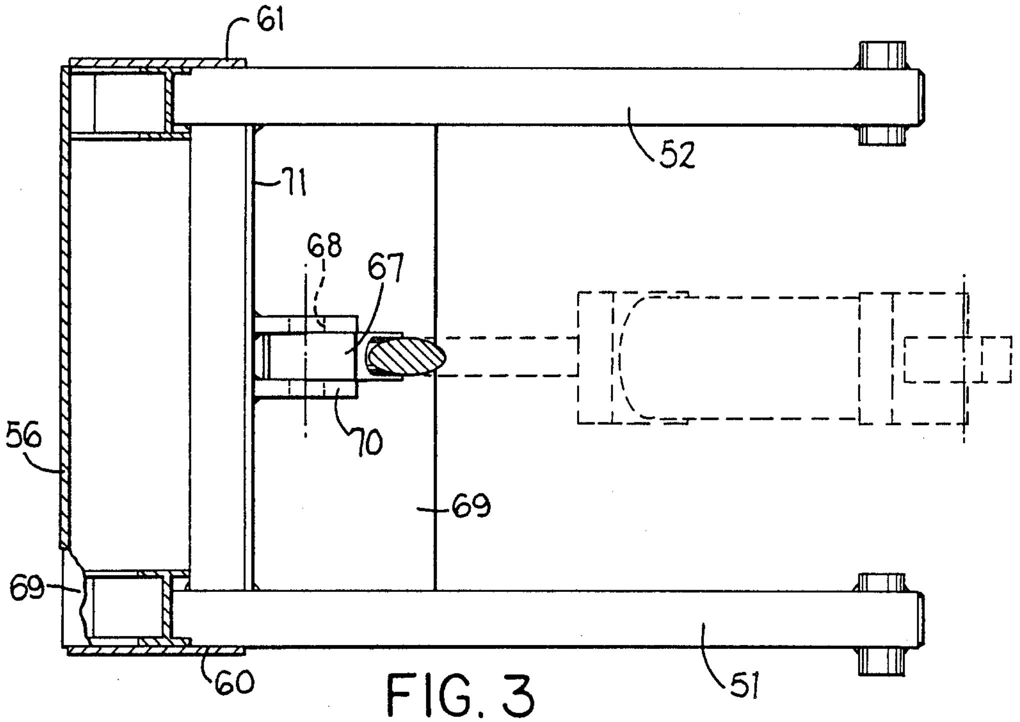
FIG. 3 is a fragmentary sectional view substantially taken on the line III—III of FIG. 2, and showing, in broken line, the portion of the ram cylinder above the cutting plane.
Figure 4:
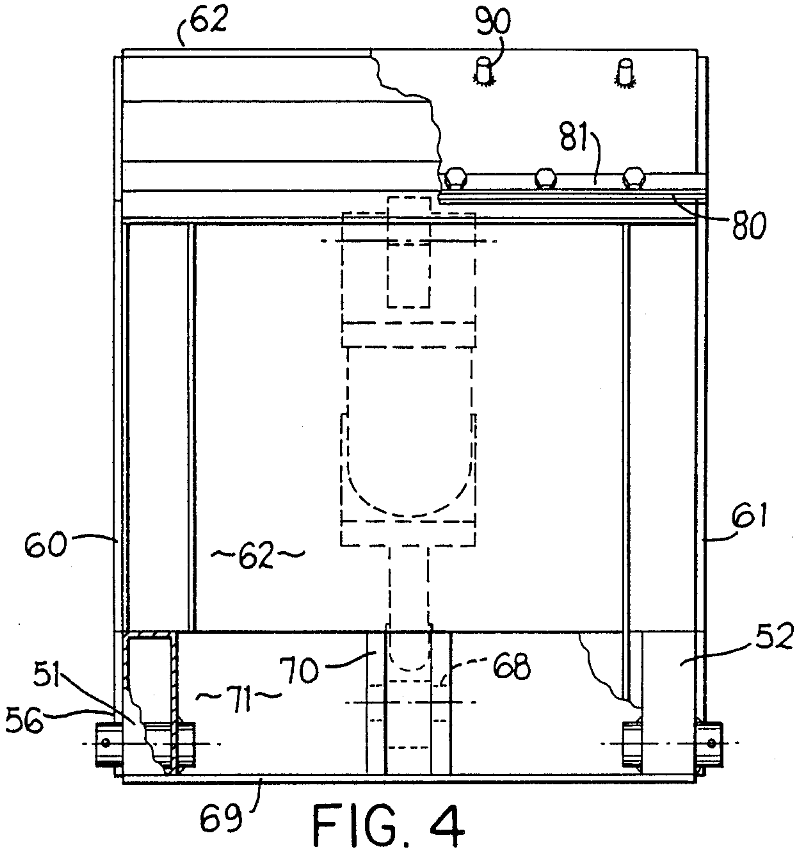
FIG. 4 is a sectional view substantially taken on the line IV—IV of FIG. 2, and showing, in broken line the portion of the ram cylinder forward of (to the right of FIG. 2) the cutting plane.

The loader 30 further includes a ram assembly 50 (FIG. 2) disposed within the housing 31. The ram assembly is, as seen in FIG. 2, substantially J-shaped. The ram assembly 50 comprises laterally spaced legs 51 and 52 (FIGS. 2–4) disposed in spaced parallel relation and extending generally away from the furnace 10. As seen in FIG. 2, the legs have ends (rightward ends in FIG. 2) adjacent the furnace 10 and pivoted on a pivot axis which is horizontal and parallel to the adjacent side wall 13 of the furnace 10. The pivot axis is defined by aligned pillow block bearings, one of which is shown at 53. The bearing 53 are fixed (here by bolts) to the horizontal top surface 54 of the base 32 near the rightward edge thereof.

The ram assembly 50 further includes a semi-circular ram 55. The ram 55 has a lower, trailing end 56 which is fixed to and extends between the leftward (FIG. 2) ends of the legs 51 or 52. The ram 55 includes side plates 60 and 61 which at their lower ends are fixed to and flank the legs 51 and 52, respectively, and which have top and bottom edges which curve semi-circularly about a common radius centered on the axis of the bearings 53. The ram 55 further includes a top wall 62 which is semi-circularly curved so as to extend along and be fixed to the top edges of the side plates 61. The ram 55 further includes a front end plate 63 fixed to the front (right in FIG. 2) edges of the ram side plates 60 and 61 and top wall 62. The front end plate 63 is substantially the same height as the side plates 60 and 61 and has a lower edge substantially flush with the lower edges of the side plates 60 and 61. The front end plate 63 is substantially coplanar with the pivot axis of the ram assembly 50, as defined by the axis of the bearings 53. The ram 55 is to push metal scrap into the furnace 10, and may be reinforced in any desired manner. For example, the front end plate 63 may be backed by suitable bracing, here including a beam 71 whose ends are fixed to the ram side plates 60 and 61. The ram 55 has no bottom wall and is open along the bottom edges of the front end plate 63 and side plate 60 and 61, i.e. open, as seen in FIG. 2, in a direction rightwardly and downwardly. The open bottom of the ram substantially reduces the risk of jamming of the ram by pieces of scrap slipping rearward past the bottom edge of the front end plate 63, as hereafter discussed.

A pressure fluid cylinder (here a double acting hydraulic cylinder) 64 is pivoted adjacent its rightward (FIG. 2) end on a pivot pin 65 mounted by a bracket 66 on the left surface of the rightward lateral portion 37' of the intermediate height belt 37 of the housing 31. The pressure fluid cylinder pivot pin 65 has a pivot axis parallel to that of the bearings 53. The pressure fluid cylinder 64 has a leftwardly extending piston rod 67 pivotally fixed at a pivot 68 between a pair of bracket plates 70 fixed to and extending rightward from a cross member 71 extending between and fixed to the leftward (FIG. 2) ends of the legs 51 and 52 at their joinder to the ram 55. A reinforcing plate 69 here fixedly underlies the rear portions of the legs 51 and 52 and cross member 71 to further reinforce their connection and the bracket plates 70. Thus, retraction of the ram cylinder rod 67 pivots the pressure fluid cylinder 64, legs 51 and 52 and ram 55 from their solid line position of FIG. 2 clockwise to their broken line position. Such pivoting of the ram 55 is along the concentric arcs defined by the ram top wall 62 and the bottom edges of the side plates 60 and 61.

In one embodiment according to the invention, an eight inch diameter hydraulic cylinder 64 was operated at a hydraulic pressure of 1500 psi and had a 24 inch stroke. Typical feed stroke times were 8 to 15 seconds.

A scrap chamber 72 is bounded by the housing side walls 60 and 61, a floor 73 (FIG. 2), and a downwardly and rightwardly (FIG. 2) sloped back wall 74. The floor 73 and back wall 74 extend between and are fixed to the housing side walls 40 and 41. The back wall 74 is spaced above the floor 73 sufficient to allow the ram 55 to pass therebetween. The top of the scrap chamber 72 communicates through a scrap inlet port 75, bounded by the top rim 36 of the housing, with a hopper H from which metal scrap is dropped into the chamber 72, to land atop the floor 73 in front of the ram 55. The right end of the scrap chamber 72 opens toward the furnace 10 through a scrap outlet port 76. A short, open topped chute 77 continues laterally rightwardly from the outlet port 76 into a side opening 24 in the leftward wall 13 of the furnace. The height of the outlet port 76 and of the chute 77 exceeds the height of the front end plate 63 of the ram 55 so as to readily pass metal scrap forwarded therethrough by the ram 55 into the interior of the furnace 10.

The leftward portion of the scrap chamber floor 73 curves rearward and down corresponding to the curvature of the bottom edges of the side plates 60 and 61 of the ram 55 and hence at a constant radius from the axis of the bearings 53, so that the ram 55 can move closely along and atop the floor 73 as it pivots forwardly (rightwardly in FIG. 2) toward the furnace 10.

To minimize the possibility of scrap metal becoming jammed under the lower edge of the front end plate 63 of the ram 55, a flexible seal strip 80 (or gasket) is fixed to the rightward facing, lower edge portion of the ram front end plate 63 by a clamping plate 81. The seal strip 80 extends the full width of the ram 55 and bears slidably atop the floor 73 to sweep rightwardly before it the scrap material lying on the floor 73.

The open bottom of the ram 55 permits small bits of scrap that may somehow pass under the seal strip 80, during forward advancement of the ram 55 to lie loosely beneath the ram 55 and not interfere with its movement. Such bits of scrap that may thus become trapped beneath the ram 55 tend to be pushed leftwardly off the rear portion of the floor 73 behind by the ram front end plate 63 during rearward retraction of the ram 55 from its dotted line to its solid line position in FIG. 2, to fall onto the top 54 of the base 32 for later removal.

A similar flexible seal strip 82 runs the width of the bottom edge of the back wall 74 and is fixed thereto by a clamping strip 83. The seal strip 82 bears on the ram top wall 62 so as to tend to prevent small scrap particles from escaping leftwardly from the scrap chamber 72 along the top wall 62 of the ram.

Figure 5:
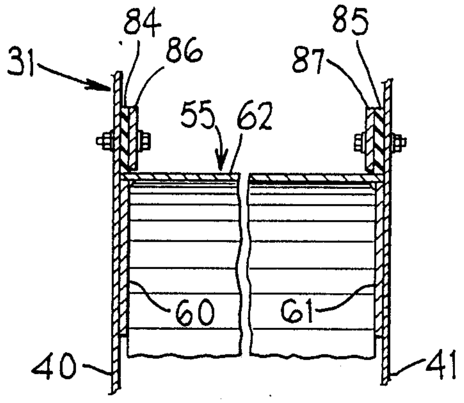
FIG. 5 is an enlarged, fragmentary sectional view substantially taken on the line V—V of FIG. 2.

Further seal strips 84 and 85 (FIG. 5) are fixed by bolted clamping strips 86 and 87 to the opposite inside surfaces of the respective housing side walls 40 and 41. The strips 84–87 extend generally forward (rightward in FIG. 2) from the back wall 74 at a constant spacing above the floor 73. The strips 84-87 curve in profile (see FIG. 2) along a constant radius from the pivot axis of the bearings 53, such that the bottom edges of the seal strips 84 and 85 provide a snug sliding seal on the top wall 62 of the ram 55 adjacent the side edges of such top wall. The curved strips 84-87 thus help to hold the front plate 63 of the ram snugly down against the floor 73 as the ram advances scrap metal rightwardly toward the furnace.

Thus, between the curved overlying strips 84–87 and the open bottom of the ram 55 considerably aid the ram 55, as it advances toward the furnace, from being lifted off the floor 73 by bits of scrap material which might otherwise jam themselves under the ram and tend to lift the leading portion of the ram upwardly away from the floor 73, thus jamming the ram in a locked position. While various materials for the seal strips 80, 82, 84 and 85 are contemplated, same must be capable of working in a high temperature and in the presence of sharp edged pieces of metal. The fabric of the seal strips 80, 82, 84 and 85 here tolerates temperatures as high as 3000° F. A fabric material, believed to be a spin-off from the federal space program, has been found to be satisfactory and is available from Thermal Ceramics, located at Augusta, Ga., under the model designation Kaowool 3000, Code #770-4849-001-00-00.

Irregularly shaped pieces of metal scrap may tend to interlock and thereby to form large masses of scrap material, namely masses larger in at least one direction than the outlet port 76 and than the corresponding side opening 24 into the furnace 10. The top edge of the ram, defined by the meeting of the ram top wall 62 and front end plate 63, is purposely spaced below the front member 36′ of the rim 36, to avoid any scissors, or shearing, action therebetween. Instead, peg-like teeth 90 (FIGS. 2 and 4) are fixed at relatively widely spaced intervals on the front face of the front end plate 63 and protrude forward (rightward in FIG. 2) therefrom. The teeth 90 engage and tangle in tangled masses of scrap that may be present in scrap in the scrap chamber 72. Thus, as the ram 55 moves forward toward the furnace 10, a quantity of scrap snagged by one or more of the teeth 90 is dragged forward beneath the front member 36′ of the rim 36 and is thereby torn from the main mass of scrap metal in the central portion of the scrap chamber 72, which main mass is prevented from moving forwardly by abutment with the front member 36′ of the rim.

The scrap loader 30 is protected from the heat of the furnace issuing leftwardly from the furnace side opening 24. As seen in FIG. 2, a flexible flap 91 of high temperature resistant material may be mounted at 92 above the furnace opening 24, so as to depend into and block most of such furnace opening 24. The flap 91 is sufficiently flexible as to permit a free flow of scrap material through the outlet port 76 and into the side opening 24 of the furnace, in response to repetitive advancing and retracting of the ram 55.

In addition, or instead, an air curtain device 93 may be used. In the embodiment shown, the air curtain device 93 comprises a tube 94 fed with room temperature air under pressure by any conventional means not shown and extending horizontally across the open top of the chute 77. Holes or jets 95 distributed along the bottom of the tube 94 direct a "curtain" of unheated air downwardly into the chute 77 between the outlet port 76 of the scrap loader 30 and the side opening 24 of the furnace. This tends to isolate the scrap loader 30 from hot gases escaping from the furnace 10. More particularly, different portions of the air from the air jets of the air curtain device 93 enter the scrap chamber 72 and enter the side opening of the furnace. Such tends to drive back hot gases from the furnace and prevent their entry into the scrap chamber.

Unless otherwise indicated in the drawings, the various steel pieces that are fixed relative to each other to make up the housing 31 and ram assembly 50 are preferably so fixed together by welding, although other types of connection are contemplated.

OPERATION

While the operation of the above-discussed FIGS. 1–5 device will be apparent from the above description, same will be briefly reviewed below for convenient reference.

Figure 2:
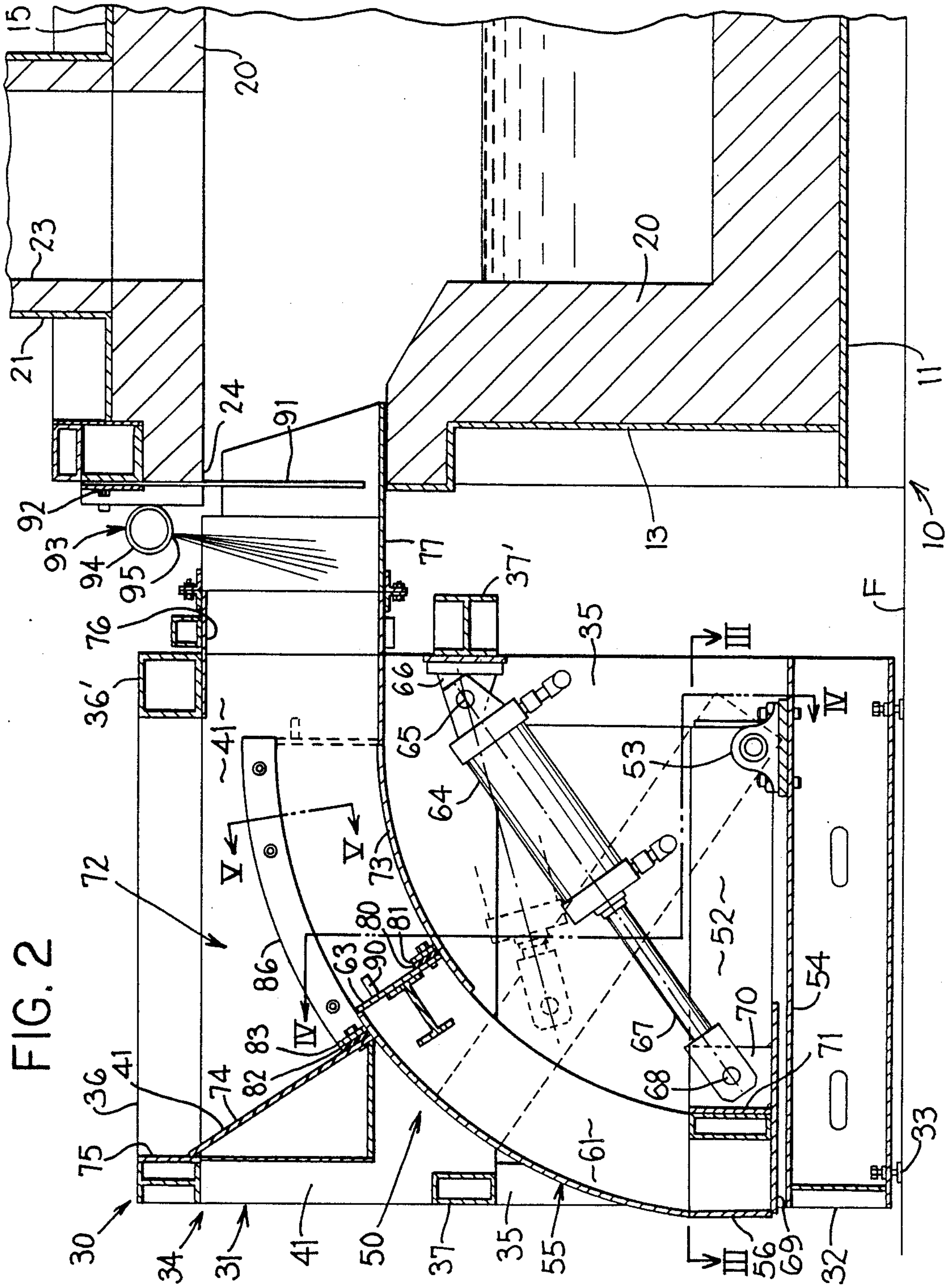
FIG. 2 is a central cross sectional view, taken from the vantage point of FIG. 1, including the scrap loader and a fragment of the molten metal furnace which it is to feed and showing retracted and extended positions of the loader ram in solid and broken lines respectively.

With the ram 55 retracted to its solid line position shown in FIG. 2, scrap metal dropped into the chamber 72 through the inlet port 75 slides down along the back wall 74 and settles on the floor 73. Retraction of the piston rod 67 of the pressure fluid cylinder 64 pivots the ram assembly 50 about the axis of the bearings 53, causing the legs 51 and 52 and ram 55 to pivot clockwise from their solid line toward their dotted line position. Scrap metal lying on the floor 73 ahead of the ram front plate 63 is driven forwardly by the ram 55 along the floor 73 and toward the outlet port 76. The portion of the scrap metal pushed forward in front of the front plate 63 tends to be torn away from the overlying layer of scrap material in the chamber 72 and pushed through the outlet port and furnace side opening 24 into the furnace 10. The teeth 90 help to prevent scrap material from sliding upward off the ram front end plate 63 and thus help to tear a quantity of scrap pushed ahead of the front plate 63 loose from the overlying quantity of scrap in the upper portion of the scrap chamber 72.

After the ram 55 reaches its forward position indicated in broken lines in FIG. 2, the flow to the hydraulic cylinder 64 is reversed in a conventional manner so as to extend the piston rod 67 and drive the ram assembly 50 back to its retracted, solid line position shown in FIG. 2. This retraction of the ram 55 allows the scrap to settle further into the scrap chamber 72, so that the bottom portion of the scrap falls upon the floor 73 ahead of the ram front end plate 63, to become the next charge to be pushed by the ram 55 rightwardly through the outlet port 76 and side opening 24 into the furnace interior.

MODIFICATION

Figure 6:
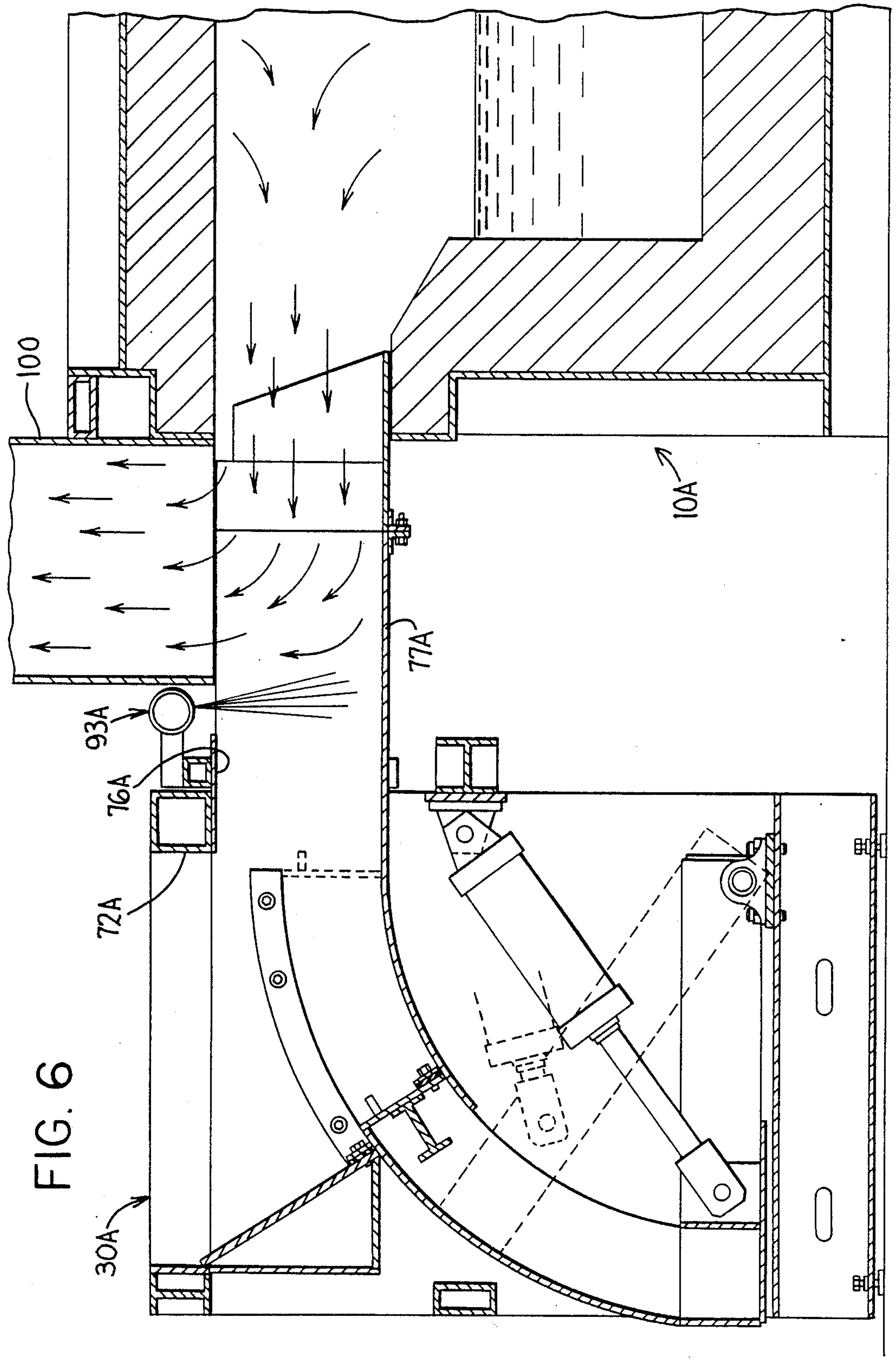
FIG. 6 is a view similar to FIG. 2 but showing modification.

Attention is directed to the modification shown in FIG. 6. The FIG. 6 embodiment is similar to that of FIGS. 1–5 except for the following differences.

The length of the chute 77A is increased substantially over that of the chute 77 of FIG. 2, to compensate for greater spacing of the FIG. 6 loader 30A from the furnace. The air curtain device 93A is located close to the outlet port 76A of the loader 30A. A further flue 100 is added above the rightward majority of the extended chute 77A to receive heated gas escaping from the furnace 10A through the furnace side opening 24A. Accordingly, heat from the furnace, that would otherwise be wasted, is used to preheat the scrap pieces moving forwardly (rightwardly in FIG. 6) through the chute 77A toward the furnace 10A. Accordingly, these scrap pieces are at an elevated temperature when they reach the furnace 10A and less energy is required to heat them to the melting point within the furnace.

To shield the loader 30A from the hot gases moving through chute 77A and up through additional flue 100, the air curtain 93A is interposed between the bottom of the chute 77A and the loader outlet port 76A. Accordingly, hot gases entering the chute 77A from the furnace tend to be driven up the additional flue 100 rather than passing into the scrap chamber 72A of the loader 30A.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A scrap loader for a molten metal furnace, comprising:

a loader housing to be positioned beside a molten metal furnace, said housing including a chamber having an inlet portion for receiving metal scrap and an outlet port through which said metal scrap is to be fed into the furnace;

means for feeding metal scrap to said chamber;

a ram assembly in said housing and comprising:

(a) a leg means pivoted with respect to said housing, and pivot means fixed with respect to said housing near said furnace and spaced below said chamber, said leg means having a retracted position extending generally horizontally away from said pivot means and furnace below said chamber, (b) a ram fixed on said leg means and pivotable therewith along a wall of said chamber past said inlet port and toward said outlet port, said ram being curved about the axis of said pivot means, said ram having a rest position extending up from said leg means remote from said furnace and curving back over a portion of said leg means, said chamber and ram defining an upper boundary and said leg means defining a lower boundary of an approximately triangle shaped space diverging upwardly and toward said furnace, (c) means actuable for pivotally advancing and retracting said ram along said chamber wall and therewith for driving metal scrap along said wall and through said outlet port into the furnace, said ram advancing means comprising an elongate longitudinally expandable and contractible linear motor fixed pivotally with respect to said housing near said furnace on a pivot vertically spaced between said pivot means of said leg means and said chamber, said elongate linear motor extending from said pivot into and being housed within said approximately triangle shaped space below said ram and chamber and above said leg means, said linear motor having a free end portion fixed adjacent a joinder of said ram to said leg means, said elongate linear motor having a rest position approximately bisecting the angle between said ram and leg means, said elongate linear motor being contractible to pivot said leg means up and advance said ram past said inlet port and toward said outlet port of said chamber.

2. The apparatus of claim 1 in which said wall and ram are semi-circular about a common pivot axis, said leg means being pivoted on said pivot axis by said pivot means, said wall being an upwardly convex floor of said chamber, said ram being upwardly convex and lying atop said floor and being slidable thereon to push scrap metal lying on said floor forwardly slidably along said floor.

3. The apparatus of claim 2 in which said ram has a leading and engageable with scrap for pushing same through said outlet port to said furnace, a first gasket fixed to the bottom front edge of said ram and slidable on said chamber floor, a further gasket on a bottom edge of a rear wall of said chamber and slidable on top of said ram, and guide means on side walls of said chamber slidably bearing on the top of said ram to urge said first gasket against said floor.

4. The apparatus of claim 3 in which said linear motor comprises pressure fluid cylinder means pivotally mounted on said housing between said pivot means and said wall, said pressure fluid cylinder means having a remote end portion pivotally connected with respect to said ram and leg means adjacent the joinder thereof, so that retraction of said pressure fluid cylinder means advances said ram toward said outlet port.

5. A scrap loader for a molten metal furnace of a type having a scrap inlet in a side thereof, comprising:

a loader housing positionable beside said furnace and having an outlet port alignable with said scrap inlet of said furnace;

a scrap receiving chamber in said housing;

a ram movable in said chamber toward said outlet port for driving scrap into said furnace;

air curtain means located in said outlet port for producing an air curtain across said outlet port and thereby reducing flow of heat from said furnace through said outlet port into said scrap receiving chamber, said outlet port comprising an elongate substantially horizontal passage extending from said loader housing to said furnace, said passage having an open top between said air curtain and the scrap inlet of the furnace for exhausting at least some of hot gases from said furnace for preheating scrap metal moving from said passage to said furnace.

6. The apparatus of claim 5 in which said air curtain is directed down into said passage between said housing and furnace, said ram being movable along a path toward said air curtain to push scrap through said air curtain toward said furnace.

7. A scrap loader for a molten metal furnace comprising:

a loader housing having a scrap receiving chamber, said chamber being bounded by a floor, a back wall, side walls flanking said back wall and a front outlet port at front ends of said side walls and spaced forward from said back wall, said back wall having an opening adjacent said floor;

a ram movable forward through said opening, said ram having an inverted box-like shape including a front wall movable forwardly along said side walls and floor of said chamber for pushing scrap metal forward through said outlet port to said furnace, said inverted box-shaped ram further having laterally spaced side plates and a top wall extending between said side plates, said top wall and side plates extending rearward from top and side edges of said front wall for preventing scrap metal from falling behind said ram front wall, a first gasket means fixed along the bottom edge of said ram front wall and slidable on said chamber floor to limit penetration of scrap metal between the bottom edge of said ram front wall and said housing floor, a further gasket means fixed along the bottom of said chamber back wall and slidable on the top wall of said ram to limit penetration of scrap metal therebetween, said housing having guide ribs on an inside of said side walls for holding said ram snug against said floor as said ram advances scrap metal toward said outlet port, to limit penetration of scrap metal between said first gasket on the bottom of said ram front wall and said housing floor, said ram having an open bottom behind said front wall thereof to prevent jamming of scrap metal between a bottom of said ram and said housing floor behind said ram front wall, said floor terminating just behind a rear limit position of said ram front wall, said housing having a space beneath said ram and floor for receiving such occasional items of scrap metal as may penetrate behind said ram front wall, said items of scrap metal being free to fall from a rear edge of said floor as said ram retracts rearward along said floor.

8. The apparatus of claim 7 in which said ram includes bracing behind said front end of said ram, said ram having teeth extending forward from said front end to prevent deflection of scrap metal pieces upward out of a path of the ram.

9. The apparatus of claim 7 in which said ram is semicircularly curved about a pivot axis spaced behind said furnace below said outlet port, said curved ram having a rear end fixed on one end portion of a leg, said leg having an opposite end portion pivoted on said pivot axis, said leg having a substantially horizontal retracted position corresponding to a rearmost position of the ram.

* * * * *

UNITED STATES PATENT AND TRADEMARK OFFICE

CERTIFICATE OF CORRECTION

PATENT NO. : 4 940 376

DATED : July 10, 1990

INVENTOR(S) : John MCCARTHY

It is certified that error appears in the above-identified patent and that said Letters Patent is hereby corrected as shown below:

Col. 7, line 41; change "(a) a leg" to ---(a) leg---.

Col. 8, lines 16 & 17; change "of said chamber" to ---of said scrap chamber---.

Signed and Sealed this

Seventh Day of January, 1992

*Attest:*

HARRY F. MANBECK, JR.

*Attesting Officer* | *Commissioner of Patents and Trademarks*